United States Patent
Varnam et al.

(10) Patent No.: US 6,393,820 B1
(45) Date of Patent: May 28, 2002

(54) CHAIN

(75) Inventors: Steven M. Varnam, London (GB); Detlef Ragnitz, Einbeck (DE); Michael Charles Christmas, Cheadle Hulme (GB)

(73) Assignee: Renold Plc (GB)

(*) Notice: Subject to any disclaimer, the term of this patent is extended or adjusted under 35 U.S.C. 154(b) by 0 days.

(21) Appl. No.: 09/720,558

(22) PCT Filed: Jul. 2, 1999

(86) PCT No.: PCT/GB99/02113
§ 371 (c)(1),
(2), (4) Date: May 3, 2001

(87) PCT Pub. No.: WO00/01610
PCT Pub. Date: Jan. 13, 2000

(30) Foreign Application Priority Data

Jul. 4, 1998 (GB) .............................................. 9814434
Mar. 19, 1999 (GB) .............................................. 9906219

(51) Int. Cl.[7] .............................................. F16G 13/04
(52) U.S. Cl. ........................ 59/78; 59/4; 59/5; 474/212; 474/213
(58) Field of Search ...................... 59/4, 5, 78; 474/212, 474/213

(56) References Cited

U.S. PATENT DOCUMENTS

| 4,915,675 A | 4/1990 | Avramidis | 474/213 |
|---|---|---|---|
| 5,176,586 A | 1/1993 | Sugimoto | 474/212 |
| 5,445,570 A | 8/1995 | White | 474/213 |
| 5,758,484 A * | 6/1998 | Ledvina et al. | 59/5 |

FOREIGN PATENT DOCUMENTS

| EP | 0 833 077 A1 | 4/1998 | ........... F16G/13/04 |
|---|---|---|---|

* cited by examiner

Primary Examiner—David Jones
(74) Attorney, Agent, or Firm—Akin, Gump, Strauss, Hauer & Feld, LLP

(57) ABSTRACT

A chain such as these used in a fork lift truck carriage lifting mechanism has a plurality of interleaved link assemblies each having a pair of outer link plates and a plurality of intermediate link plates. The outer link plate has a strength less than that of any intermediate link plate when measured in an unassembled state. The reduced strength may be achieved by a reduction in thickness or head area of the link plate. The outer link plates may have a stiffness of 60% to 90% of the average stiffness across the chain and a first group of intermediate link plates of certain chain configurations have a stiffness of 70% to 90% of the average stiffness of the chain. The invention provides for a chain in which the load is more evenly shared between link plates and allows a single composite chain to be replaced by two smaller chains without loss of load capacity.

6 Claims, 3 Drawing Sheets

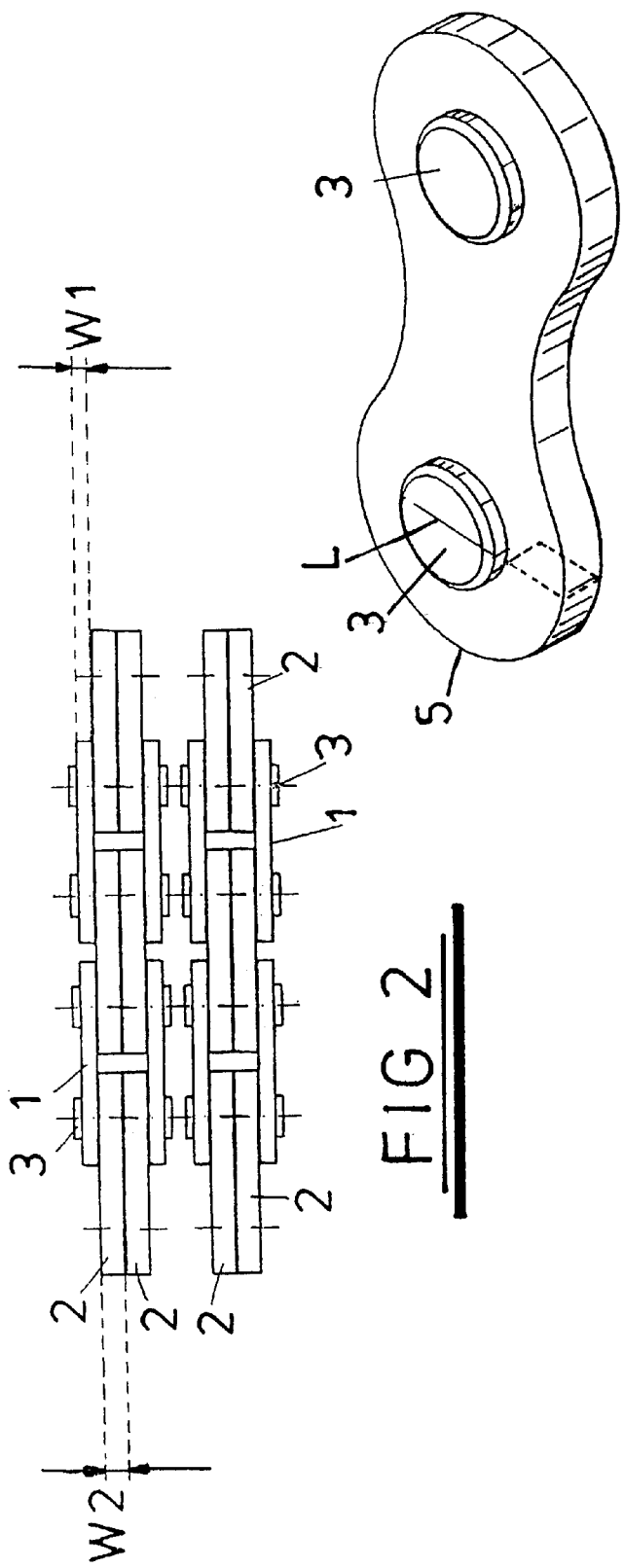
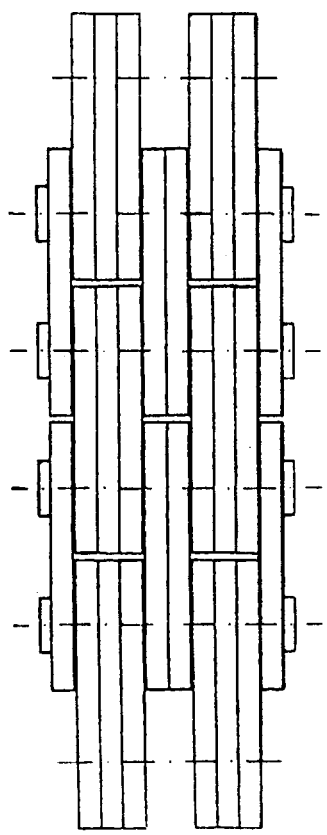
FIG. 2
FIG. 2a
FIG. 3

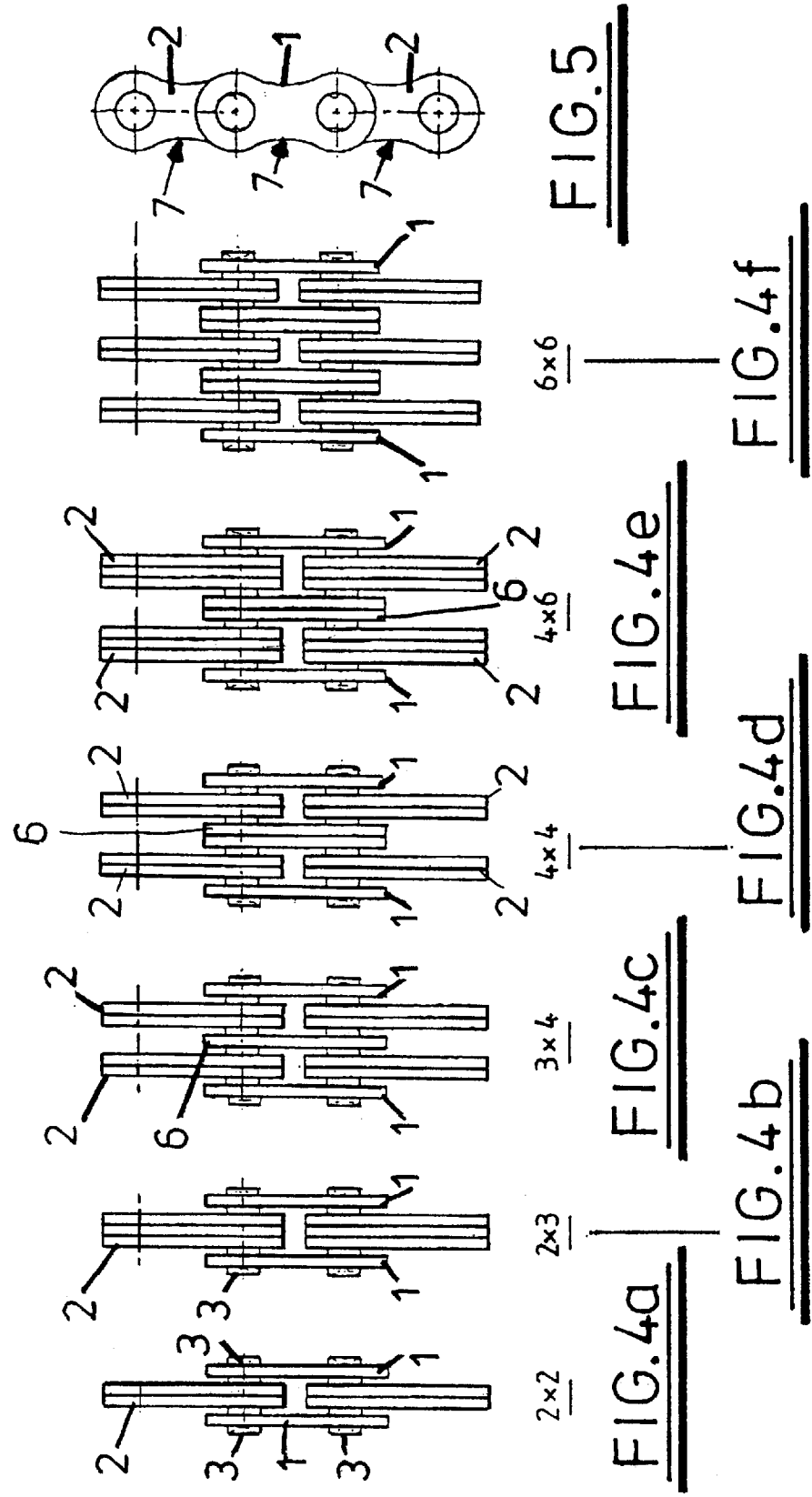

CHAIN

CROSS-REFERENCE TO RELATED APPLICATIONS

This application claims priority to: PCT Application No. PCT/GB99/02113 filed on Jul. 2, 1999; Great Britain Application No. 9906219.2 filed on Mar. 19, 1999; and Great Britain Application No. 9814434.8 filed on Jul. 4, 1998.

The present invention relates to a lifting chain and more particularly, but not exclusively, to a lifting chain of the kind that is used in the raising and lowering of a lifting fork carriage of a fork lift truck.

In fork lift trucks the lifting fork carriage is raised or lowered by a mast assembly comprising at least one hydraulic jack having a sheave at its upper end over which is trained a lifting chain. A lower end of the jack is fixed to the truck and a first end of the lift chain is connected to the lifting fork carriage by an anchor assembly. The ether end of the chain is fixed to a stationary structure on the truck.

It is well known for the mast assembly to have two pairs of lifting chains and sheaves, the pairs being connected to the carriage at laterally spaced locations.

When the hydraulic jack is extended the sheave (or sheaves) is moved upwardly and the chain (or chains) is lifted so as to rise the carriage.

A lifting chain of this kind generally comprises a plurality of interleaved links, each link being formed by a plurality of link plates of identical configuration disposed in a side-by-side relationship. Overlapping ends of the interleaved link plates are mounted on a common pin. The outermost link plates are normally connected to the pin with an interference fit between a pit hole in the plate and the pin whereas the remaining intermediate link plates are pivotally mounted on the pin with a clearance fit. The degree of interference fit is normally sufficient to cold work the plate material locally at the interface between the pin and the pin hole. It has now been realised that this causes plastic deformation and an artificial increase in the ability of the plate to resist fatigue loads.

The particular number and arrangement of the intermediate link plates in comparison to outer link plates is selected according to the required lifting capacity of the chain. Generally, these are at least two first groups of intermediate link plates offset from the outer link plates and connected thereto by the pins. The first groups of intermediate link plates may comprise two or more aligned, adjacent plates, the number depending on the application. In larger size chains there may be further groups of intermediate link plates. Second groups of intermediate link plates are positions in-board of the first groups and are aligned with the outer link plates, third groups are disposed in-board of the second groups and aligned with the first groups, and so on.

In order to manufacture a chain as cheaply as possible and to keep the number of different components of a single chain to a minimum it is conventional for all the plates (outer and intermediate) to be of the same thickness and shape having been produced by the same tool from a sheet of metal of constant thickness.

Tests have established that, in use, the majority of the load on such chains is taken by the outermost link plates. Accordingly, it has been known for the thickness of the outer link plates to be increased in comparison to the intermediate link plates so as to increase the lifting capacity of the chain.

Further tests conducted by the applicant have established that, in fact, the closer the link plate is to the centre of the chain, the lower the loading. In addition, as a result of the clearance fit with the pins, the central intermediate plates do not initially contribute to the bearing of the load during initial application of the load. It is obviously undesirable for the load to be distributed unevenly in this way across a chain and for the outer plates to be under such stress.

It is well known that the fatigue load capacity of a given lifting chain can be increased by replacing it with two separate side-by-side chains each having fewer links across its width than the original chain. However, in many circumstances the substitution of a single relatively wide chain by two narrower chains is not possible owing to the limited space available. Since there has to be a lateral clearance between the pins of the side-by-side chains there is generally insufficient room to make this substitution in a mast assembly of a fork lift truck.

It is an object of the present invention to obviate or mitigate the aforesaid disadvantages or problems.

SUMMARY OF THE INVENTION

According to the present invention there is provided a lifting chain having a first end for connection to a stationary structure and a second end for connection to an object to be moved, the chain comprising a plurality of interleaved link assemblies, each link assembly comprising outer link plates and a plurality of intermediate link plates, adjacent link assemblies being interconnected by a pin on which the outer link plates are non-rotatably mounted by means of an interference fit and the intermediate link plates are mounted so as to be rotatable relative thereto, characterised in that each outer link plate has a strength less than that of any intermediate link plate when measured in an unassembled state.

The reduction in strength of the outer link plate can be achieved, for example, by reducing its thickness or "head" area in comparison to that of an intermediate link plate, or using a different material or manufacturing method. The term "head" area is used herein in the description and claims to means the cross sectional area of the link taken along a radial line that passes through the centre of the pin and intersects the nearest outer edge of the chain link plate.

Since it has been understood that a disproportionate amount of the lifted load is carried by the outer link plates, to date it has not been thought possible to reduce the strength of the outer link plates by, for example, reducing their thickness. However, by directing the chain design towards achieving optimum fatigue resistance rather than increasing its tensile strength, it has been realised that by taking advantage of the enhanced fatigue performance (referred to above) provided by the interference fit between the outer link plates and the pin, a reduction in the strength of the outer plate (in the unassembled state) is possible.

If the outer plate is thinner than in comparison to that of known lifting chains in which plates are of all the same thickness then a single relatively wide chain may be replaced by two or more narrower chains (thereby increasing the lifting capacity of the chain) without increasing the width required to accommodate the chains.

In a preferred embodiment the outer link plates have a stiffness of 60% to 90% of the average stiffness across the chain.

Preferably a first group of intermediate link plates have a stiffness of 70% to 95% of the average stiffness across the chain.

In large chains a second group of intermediate link plates, in-board of the first group, may have a stiffness that is equal to the average stiffness and the stiffness of further groups of intermediate link plates is shared equally.

BRIEF DESCRIPTION OF THE DRAWINGS

Specific embodiments of the present invention will now be described, by way of example only, with reference to the accompanying drawings in which:

FIG. 2 is a plan view of the chains of FIG. 1;

FIG. 2a shows in plan view a relatively wide lifting chain for the purposes of comparison to the chains of FIG. 2;

FIG. 3 is a perspective view of a outer link plate with reduced "head" area according to the present invention;

FIG. 4a is a plan view of a 2×2 multiple leaf chain link in accordance with the present invention;

FIG. 4b is a plan view of a 2×3 multiple leaf chain link in accordance with the present invention;

FIG. 4c is a plan view of a 3×4 multiple leaf chain link in accordance with the present invention;

FIG. 4d is a plan view of a 4×4 multiple leaf chain link in accordance with the present invention;

FIG. 4e is a plan view of a 4×6 multiple leaf chain link in accordance with the present invention;

FIG. 4f is a plan view of a 6×6 multiple leaf chain link in accordance with the present invention; and FIG. 5 is a side view of any one of the chains of FIG. 4a to 4f.

DETAILED DESCRIPTION

Figure 1:
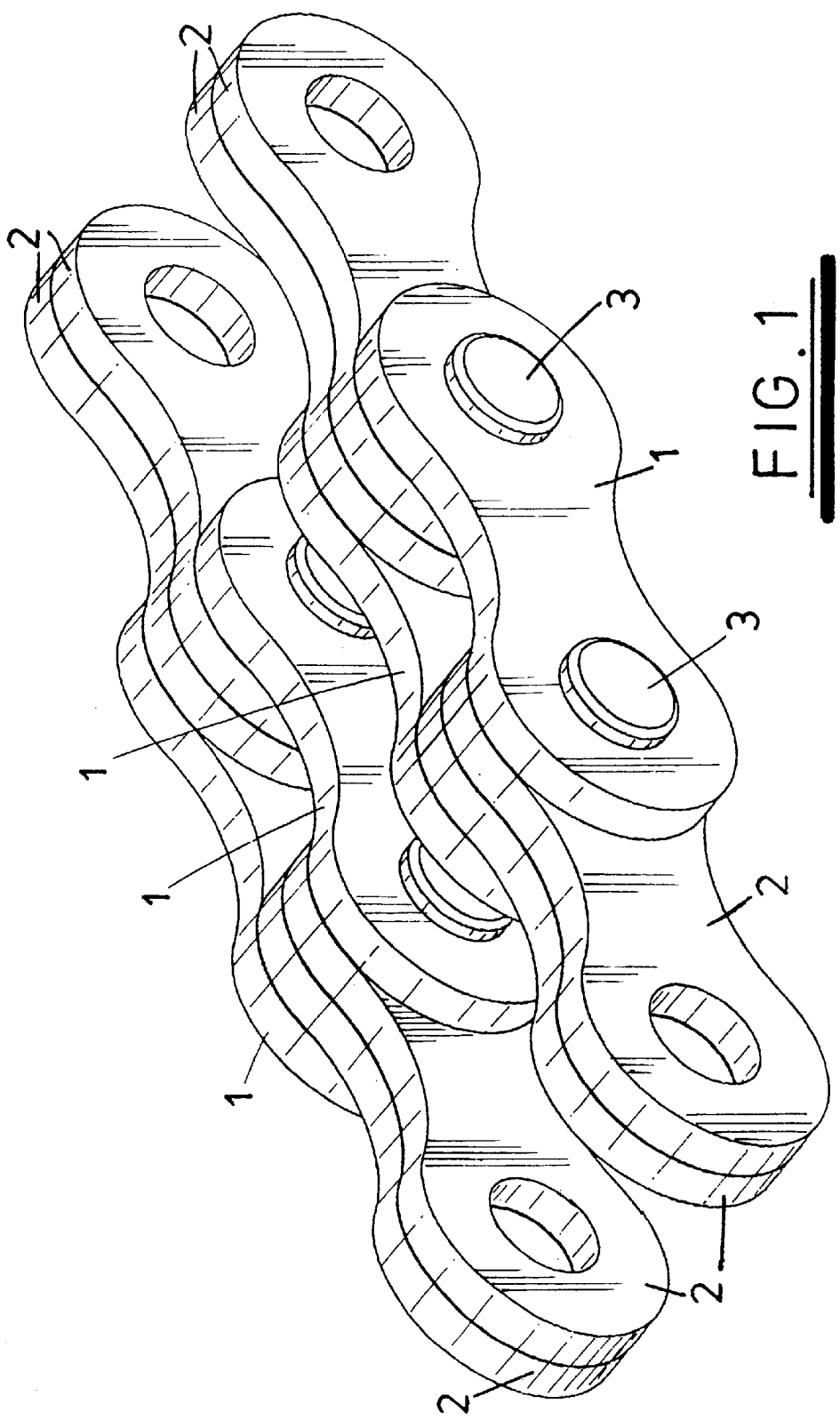
FIG. 1 is a perspective view of a pair of chains of the present invention.

Referring now to the drawings, two chains embodying the present invention are shown side by side in FIGS. 1 and 2.

Each chain comprises outer link plates 1 and intermediate link plates 2 that are connected together in a pivotal relationship by pins 3.

The outer and intermediate link plates 1,2 are interleaved such that opposed pairs of outer link plates 1 receive between them the ends of two side-by-side intermediate link plates 2. The overlapping ends of the intermediate and outer link plates 1,2 are pivotally interconnected by means of a pin 3 that passes through aligned apertures in the plates. The outer link plates 1 are connected to the pin by way of an interference fit between the pin 3 and apertures (i.e. the outer link plates 1 are non-rotatable on the pin 3) whereas the intermediate link plates are a clearance fit with the pin (i.e. they are free to rotate on the pin 3).

Lifting chains of this kind can be configured with other arrangements of interleaved intermediate link plates and an example is shown in FIG. 2a. The chains of FIGS. 1 and 2 are commonly referred in the art as 2×2 chains and the chain of FIG. 2a is known as a 4×6 chain.

The outer link plates of FIGS. 1 and 2 are thinner in width W1 than the corresponding dimension, W2, of the intermediate link plates. This arrangement provides for a chain having an overall width equal to or less than an existing 2×2 chain.

By way of example, such a 2×2 chain may have the following dimensions:

| | |
|---|---|
| Pitch: | 18.5 mm |
| Head: | 15.4 mm |
| Waist: | 13.7 mm |
| Intermediate Plate Thickness: | 4 mm |
| Outer Plate Thickness: | 2.7 mm |
| Pin Diameter: | 6.8 mm |

It will be seen from FIGS. 2 and 2a that the total combined width of two side-by-side 2×2 chains is the same or narrower than the 6×4 chain. Thus in a confined working space a 6×4 chain may be replaced by a pair of side-by-side 2×2 chains so as to provide a greater lifting capacity.

In applications where the working area is not so restricted the outer link plates may otherwise be reduced in strength.

For example, the outer link plate shown in FIG. 3 has a reduced "head" area in comparison to the intermediate link plates. The head area is defined as the cross sectional area of the plate taken about any line L that passes through the centre of the pin receiving aperture and intersects the nearest (rounded) edge of the plate. This reduced area (shown in dotted line in FIG. 3) may be achieved, for example, by enlarging the aperture or reducing the size of the rounded end 5 of the link.

An example of such a chain is as follows:

| | |
|---|---|
| Pitch: | 18.5 mm |
| Intermediate Plate Head: | 15.4 mm |
| Outer Plate Head: | 13.0 mm |
| Intermediate Plate Waist: | 13.7 mm |
| Outer Plate Waist: | 12.0 mm |
| Plate Thickness: | 4 mm |
| Pin Diameter: | 6.8 mm |

In other alternatives the outer link plate may simply be constructed from a material with lower tensile strength than that of the intermediate link plates.

It is envisaged that the ratio of intermediate plate to outer plate strength could be in the range 1.1:1 to 1.6:1.

In all instances the reduction of strength of the outer link plate in comparison to the intermediate link plates is measured with the plates in an unassembled state i.e. before they are interconnected by the pin. Once the plates are assembled the interference in between the outer link plates and the pin provides a compensatory increase in the fatigue strength of the outer link plates.

The invention enables wider chains of this nature (such as 8×8 or 6×4) to be replaced by a plurality of 2×2 chains thereby eliminating the requirements for a chain manufacturer to produce a range of chains of differing widths. However, in certain applications it may still be desirable to use a larger chain width having outer links with reduced strength. FIGS. 4a to 4f show different multiple leaf chain link configurations for different loads and applications.

In the 2×2 chain shown in FIG. 4a there are only two groups of intermediate link plates 2 centrally disposed in the chain. Each group is offset from the outer link plates 1 and comprises a pair of adjacent, aligned plates. In an alternative embodiment shown in FIG. 4b the group of intermediate link plates 2 comprises two lots of three adjacent, aligned plates.

Alternative configurations showing additional groups of intermediate link plates are shown in FIGS. 4c to 4f. Taking FIG. 4e as an example, there is shown a central pair of aligned intermediate link plates 6 and four groups of intermediate link plate pairs 2 disposed one-board of the central intermediate link plates 6. Each plate, as shown in FIG. 5, has a central waisted area 7.

The reduction of strength in the outermost link plate in the unassembled state ensures that the load is balanced across the width of the chain. This also results in the reduction of stiffness of the outer link plates 2 in the assembled state.

In a typical 8×8 chain (not shown) there is a pair of opposed outer link plates, a first groups of intermediate link plates adjacent but offset from the outer link plates, each first group comprising two adjacent and aligned plates, a second group of similar intermediate link plates in-board of the first groups but offset therefrom (and aligned to the outer link plates), a third group of intermediate link plates aligned to the first groups and a central group of links plates. It has been found that the performance of such a chain of this configuration is improved by reducing the stiffness of the outer link plates to 78.6% of the average stiffness across the chain, reducing the stiffness of the first intermediate link plates to 85.7% of average, ensuring that the second group of intermediate plates has a stiffness equivalent to the average of the chain and ensuring that the stiffness of the other plates is shared equally as the average chain stiffness plus the stiffness that was removed from the other plates.

The stiffness of each plate is determined by several factors, namely, the plate thickness, the area of the plate profile, whether the aperture of the plate is at interference or clearance fit with the pin to which it is connected and the degree of interference or clearance. Thus the stiffness of each plate can be decreased or increased as required by varying one or more of these parameters. The plate profile area can be reduced for example by increasing the size of the waisted area.

It is to be understood that the exact stiffness reduction or increase of the plates can be varied by changing one or more of these features as desired. Moreover, the exact percentage increase or decrease of stiffness required is dependent on the chain configuration. It is believed that the stiffness of the outer plate, for example, may be reduced anywhere between 50% and 90% of the average stiffness of the chain and the stiffness of the first group of intermediate link plates may be reduced to anywhere between 70% and 90% of average.

The stiffness of the assembled chain is constant across the width of the chain when account is taken of the stiffness variation caused by the pin connections and frictional contact between individual plates. This ensures that as a load is increased incrementally there is a corresponding incremental increase in the stiffness across the width of the chain.

What is claimed is:

1. A lifting chain comprising:
   a first end;
   a connector means at said first end for connection to a stationary structure;
   a second end;
   a connector means at said second end for connection to an object an be moved; and
   a plurality of interleaved link assemblies, each link assembly comprising:
      outer link plates; and
      a plurality of intermediate link plates, adjacent link assemblies being interconnected by a pin on which the outer link plates are non-rotatably mounted by means of an interference fit and the intermediate link plates are mounted so as to be rotatable relative thereto, characterised in that each outer link plate has a strength less than that of any intermediate link plate when measured in an unassembled state.

2. A lifting chain according to claim 1, wherein the outer link plates are thinner than the intermediate link plates.

3. A lifting chain according to claim 1, wherein the outer link plates are smaller in head area as compared to the intermediate link plates.

4. A lifting chain according to claim 1, wherein the outer link plates have a stiffness of 60% to 90% of the average stiffness across the chain.

5. A lifting chain according to claim 1, wherein a first group of intermediate link plates have a stiffness of 70% to 95% of the average stiffness across the chain.

6. A lifting chain according to claim 5, wherein a second group of intermediate link plates, in-board of the first group, have a stiffness that is equal to the average stiffness and the stiffness of further groups of intermediate link plates is shared equally.

\* \* \* \* \*